US008656223B2

(12) United States Patent
Paul et al.

(10) Patent No.: US 8,656,223 B2
(45) Date of Patent: Feb. 18, 2014

(54) PERIPHERAL COMPONENT INTERCONNECT EXPRESS ROOT PORT MIRRORING

(71) Applicant: Dell Products, LP, Round Rock, TX (US)

(72) Inventors: Indrani Paul, Round Rock, TX (US); Johan Rahardjo, Austin, TX (US); Mukund P. Khatri, Austin, TX (US)

(73) Assignee: Dell Products, LP, Round Rock, TX (US)

( * ) Notice: Subject to any disclaimer, the term of this patent is extended or adjusted under 35 U.S.C. 154(b) by 0 days.

(21) Appl. No.: 13/780,897

(22) Filed: Feb. 28, 2013

(65) Prior Publication Data
US 2013/0173957 A1 Jul. 4, 2013

Related U.S. Application Data

(63) Continuation of application No. 12/828,686, filed on Jul. 1, 2010, now Pat. No. 8,402,307.

(51) Int. Cl.
G06F 11/00 (2006.01)

(52) U.S. Cl.
USPC .................. 714/44; 714/25; 714/48

(58) Field of Classification Search
USPC ........... 714/5.1, 6.1, 6.2, 6.22, 6.23, 44, 47.1, 714/48, 25
See application file for complete search history.

(56) References Cited

U.S. PATENT DOCUMENTS

| 7,363,426 | B2 | 4/2008 | Ahmadian et al. |
| 7,496,747 | B2 | 2/2009 | Nguyen et al. |
| 7,793,145 | B2 * | 9/2010 | Kalwitz ........................ 714/6.12 |
| 2008/0159321 | A1 | 7/2008 | Rispoli et al. |
| 2009/0063894 | A1 * | 3/2009 | Billau et al. ........................ 714/5 |
| 2009/0259882 | A1 * | 10/2009 | Shellhamer ........................ 714/7 |
| 2012/0005539 | A1 | 1/2012 | Paul et al. |

OTHER PUBLICATIONS

U.S. Appl. No. 12/726,277, filed Mar. 24, 2010.

* cited by examiner

Primary Examiner — Sarai Butler
(74) Attorney, Agent, or Firm — Larson Newman, LLP

(57) ABSTRACT

An information handling system includes a peripheral component interconnect express root complex, a basic input output system, and a root complex mirroring block. The peripheral component interconnect express root complex includes a plurality of peripheral component interconnect express ports. The basic input output system is in communication with the peripheral component interconnect express root complex, and is configured to detect a peripheral component interconnect express adaptor configuration, and to set a peripheral component interconnect express mirroring setting based on the peripheral component interconnect express adaptor configuration. The root complex mirroring block is in communication with the basic input output system, and is configured to mirror data between a first peripheral component interconnect express adaptor and a second peripheral component interconnect express adaptor based on the peripheral component interconnect express mirroring setting.

20 Claims, 5 Drawing Sheets

PERIPHERAL COMPONENT INTERCONNECT EXPRESS ROOT PORT MIRRORING

CROSS REFERENCE TO RELATED APPLICATIONS

This application is a continuation of U.S. patent application Ser. No. 12/828,686 entitled "Peripheral Component Interconnect Express Root Port Mirroring," filed on Jul. 1, 2010, the disclosure of which is hereby expressly incorporated by reference in its entirety.

FIELD OF THE DISCLOSURE

This disclosure relates generally to information handling systems, and more particularly relates to peripheral component interconnect express root port mirroring.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

An information handling system can include multiple servers, and each server can host multiple virtual machines. The information handling system can implement data redundancy in each of the servers to protect the data of the virtual machines in the event of a failure in a drive of the server. For example, storage domain redundancy solutions can stripe a redundant array of independent disks (RAID) volume across multiple drives, which can protect against a single drive failure. Thus, when the drive fails the remaining drives can be used to recreate the lost data.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings can certainly be utilized in this application.

Figure 1:
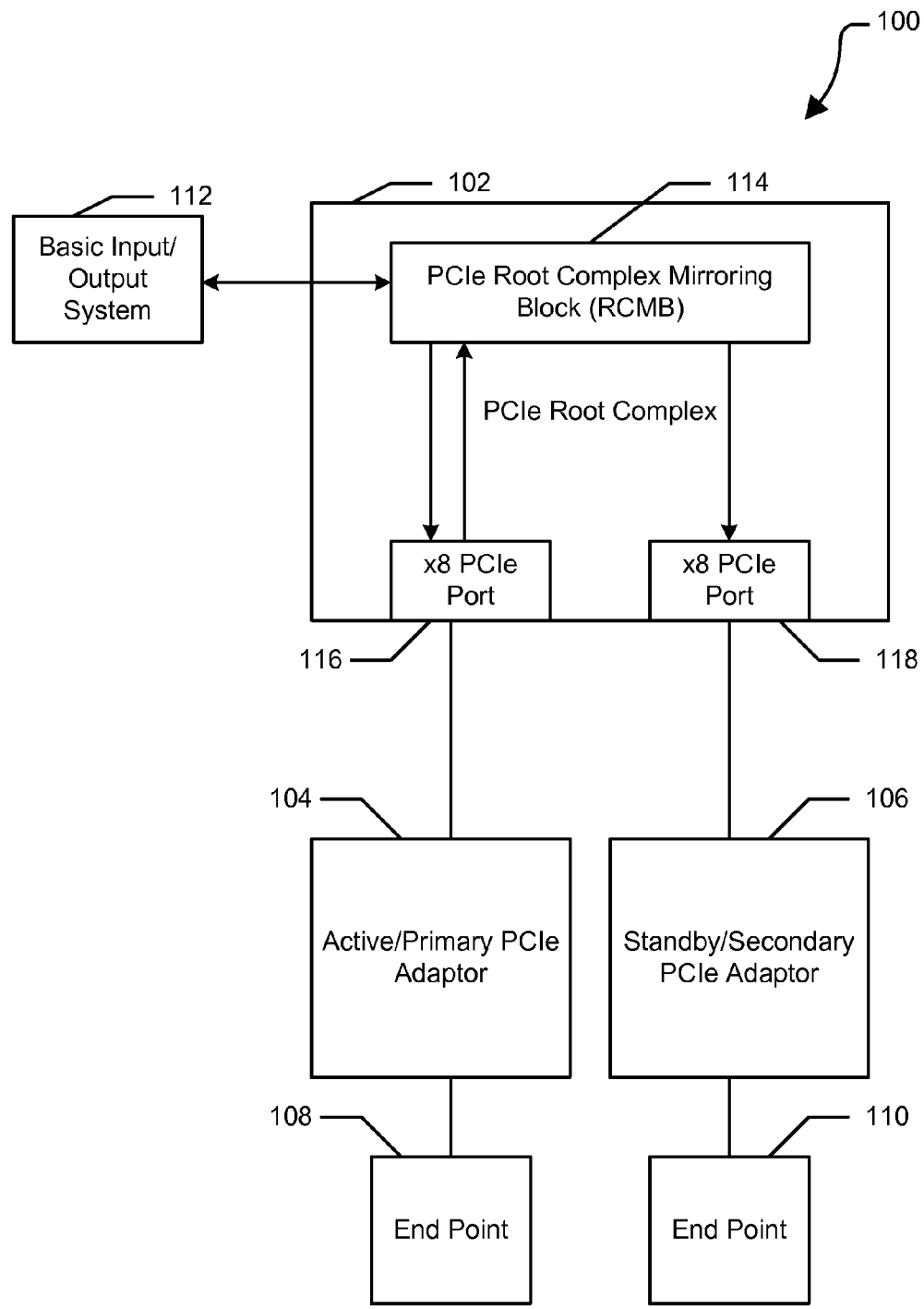
FIG. 1 is a block diagram of an embodiment of an information handling system.

FIG. 1 shows an information handling system 100. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

The information handling system 100 includes a peripheral component interconnect express (PCIe) root complex 102, a primary PCIe adaptor 104, a secondary PCIe adaptor 106, end points 108 and 110, and a basic input/output system (BIOS) 112. The PCIe root complex 102 includes a PCIe root complex mirroring block (RCMB) 114 and PCIe ports 116 and 118. The PCIe root complex 102 is in communication with the primary PCIe adaptor 104 and with the secondary PCIe adaptor 106. The PCIe adaptor 104 is in communication with the end point 108, and the secondary PCIe adaptor 106 is in communication with the end point 110. The BIOS 112 is in communication with the PCIe RCMB 114, which in turn is in communication with the primary PCIe adaptor 104 via the PCIe port 116 and with the secondary PCIe adaptor 106 via the PCIe port 118. The end points 108 and 110 can be a connecting cable, a PCIe hard drive, fiber channel, or the like. The PCIe ports 116 and 118 can include different portions of an x16 link input/output unit (IOU), such as an x4 port, an x8 port, or the like. The IOU can be a group of x16 data links that can be provided from the PCIe root complex 102 to one or more PCIe adaptors. The PCIe RCMB 114 can be hardware built into the root complex 102 of a chipset of the information handling system 100.

During initialization of the information handling system 100, the BIOS 112 can determine information about the primary PCIe adaptor 104 via the PCIe port 116, and information about the secondary PCIe adaptor 106 via the PCIe port 118. The information can include a type of PCIe adaptor, a size of the PCIe link utilized between the PCIe port and the PCIe adaptor, and the like. The BIOS 112 can store the information associated with the PCIe adaptors 104 and 106 and information associated with the PCIe ports 116 and 118 as a PCIe configuration, which can be retrieved by the PCIe RCMB 114 at the end of the initialization of the information handling system 100. The PCIe RCMB 114 can determine from the PCIe configuration information that the PCIe port 116 is an x8 link and is connected to the primary PCIe adaptor 104, and that the PCIe port 118 is an x8 link and is connected to the secondary PCIe adaptor 106. The PCIe RCMB 114 can also determine that the end points 108 and 110 are both serial attached small computer system interface (SAS)/PCIe hard drives. The PCIe RCMB 114 can utilize the PCIe configuration information to create a PCIe mirroring setting. For example, the PCIe RCMB 114 can use the PCIe configuration to set the primary PCIe adaptor 104 as an active PCIe adaptor and to set the secondary PCIe adaptor as a standby adaptor to create redundancy in the information handling system.

During operation of the information handling system 100, the PCIe RCMB 114 can mirror the data from the primary PCIe adaptor 104 to the secondary PCIe adaptor 106. Thus, during read and write requests from other portions of the information handling system 100, the PCIe RCMB 114 can read data only from the primary PCIe adaptor 104, but can write data to both the primary PCIe adaptor and the secondary PCIe adaptor 106. In an embodiment, the primary PCIe adaptor 104 and the secondary PCIe adaptor 106 may not necessarily have the same configuration, such as a PCIe link size, storage capacity, and the like.

If the primary PCIe adaptor 104, the end point 110, or the PCIe port 118 fails, the PCIe RCMB 114 can recover the lost data by reading data from the secondary PCIe adaptor 106 and setting the secondary PCIe adaptor as the primary PCIe adaptor. Then a new PCIe adaptor can be connected to the PCIe port 118, and the PCIe RCMB 114 can mirror the data from the PCIe adaptor 106 to the new PCIe port connected to the PCIe port 118 of the PCIe root complex 102 to create redundancy in the information handling system 100. Thus, the mirroring of the primary PCIe adaptor 104 to the secondary PCIe adaptor 106 provides the information handling system 100 with the ability to retain data during a failure of one of the PCIe adaptors, one of the end points 108 or 110, one of the PCIe ports 116 or 118, or the like.

Figure 2:
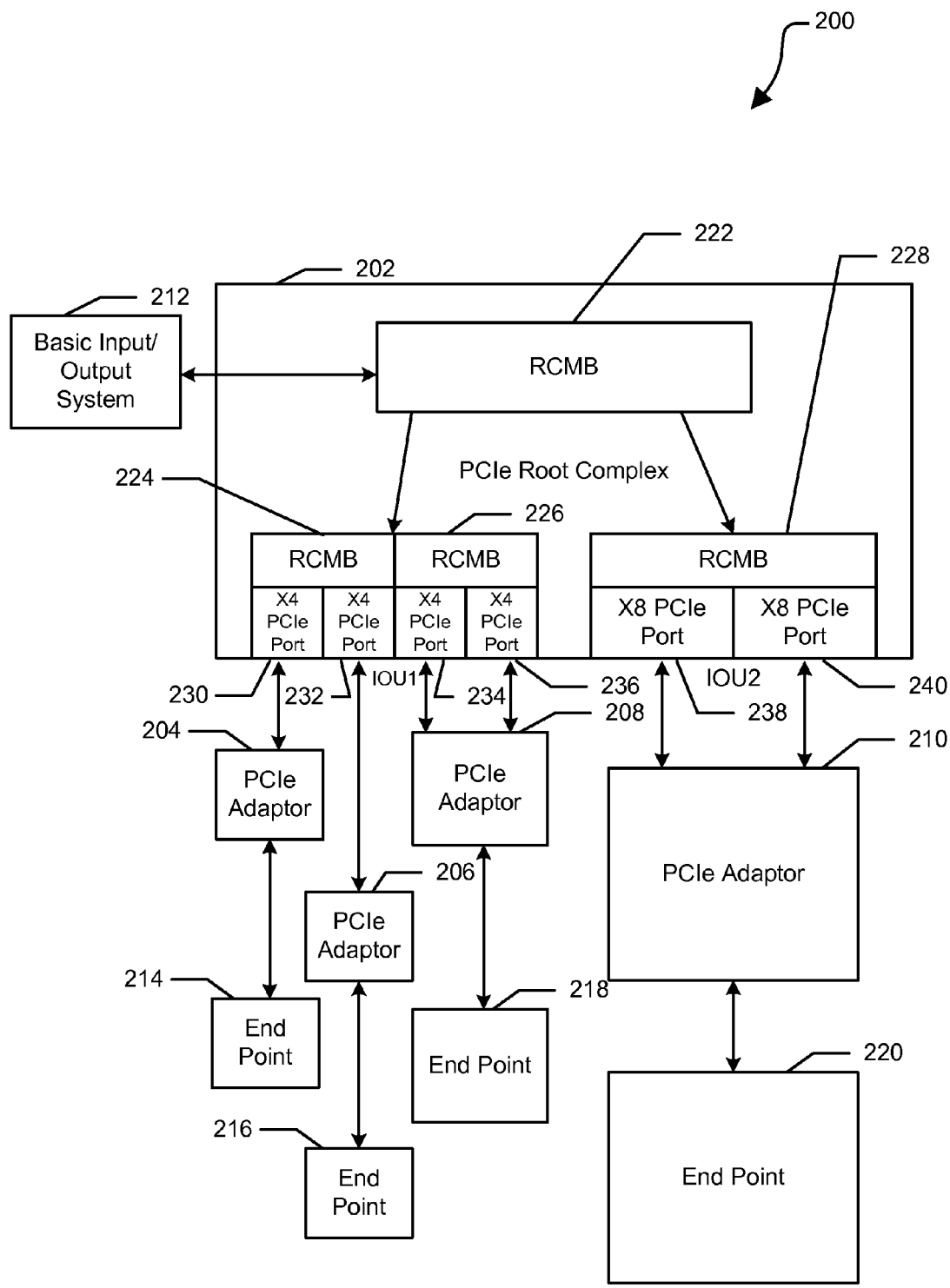
FIG. 2 is a block diagram of another embodiment of the information handling system.

FIG. 2 shows an information handling system 200 including a PCIe root complex 202, PCIe adaptors 204, 206, 208, and 210, a BIOS 212, and end points 214, 216, 218, and 220. The PCIe root complex 202 includes PCIe RCMBs 222, 224, 226, and 228, and PCIe ports 230, 232, 234, 236, 238, and 240. The PCIe root complex 202 is in communication with the PCIe adaptors 204, 206, 208, and 210, and with the BIOS 212. The PCIe adaptor 204 is in communication with the end point 214 and with the PCIe port 230. The PCIe adaptor 206 is in communication with the end point 216 and with the PCIe port 232. The PCIe adaptor 208 is in communication with the end point 218 and with the PCIe ports 234 and 236. The PCIe adaptor 210 is in communication with the end point 220 and with the PCIe ports 238 and 240.

The PCIe RCMB 222 is in communication with the PCIe RCMBs 224, 226, and 228. The PCIe RCMB 224 is in communication with the PCIe ports 230 and 232. The PCIe RCMB 226 is in communication with the PCIe ports 234 and 236. The PCIe RCMB 228 is in communication with the PCIe ports 238 and 240. The PCIe ports 230, 232, 234, and 236 preferably combine to form a first IOU. The PCIe ports 238 and 240 preferably combine to form a second IOU. The PCIe root complex 202 may also include additional IOUs with additional PCIe ports to provide the PCIe root complex with the ability to connect to additional PCIe adaptors and end points.

During initialization of the information handling system 200, the BIOS 212 can determine information about the PCIe adaptors 204, 206, 208, and 210 via the PCIe ports 230, 232, 234, 236, 238, and 240. The information can include a type of PCIe adaptor, a size of the PCIe link utilized between the PCIe port and the PCIe adaptor, and the like. The BIOS 212 can store the information associated with the PCIe adaptors 204, 206, 208, and 210 and store information associated with the PCIe ports 230, 232, 234, 236, 238, and 240 as a PCIe configuration, which can be retrieved by the PCIe RCMBs 222, 224, 226, and 228 at the end of the initialization of the information handling system 200. The PCIe RCMB 224 can determine from the PCIe configuration information that the PCIe port 230 is an x4 link and is connected to the PCIe adaptor 204, and that the PCIe port 232 is an x4 link and is connected to the PCIe adaptor 206. The PCIe RCMB 226 can determine from the PCIe configuration information that the PCIe ports 234 and 236 are both x4 links and are connected to the PCIe adaptor 208. The PCIe RCMB 114 can determine from the information of the PCIe configuration that the PCIe ports 238 and 240 are both x8 links and are connected to the PCIe adaptor 210. The PCIe RCMBs 224, 226, and 228 can also determine that the end points 214, 216, 218, and 220 are SAS/PCIe hard drives.

During operation of the information handling system 200, the PCIe RCMB 222 can control the mirroring of data between the PCIe adaptors 204, 206, 208, and 210. The PCIe RCMBs 222, 224, 226, and 228 can utilize the information in the PCIe configuration to create PCIe mirroring settings. For example, during read and write requests from other portions of the information handling system 200, the PCIe RCMB 224 can read data only from the PCIe adaptor 204, but can write data to both the PCIe adaptor 204 and to the PCIe adaptor 206. Thus, the PCIe RCMB 224 can mirror data from the PCIe adaptor 204 to the PCIe adaptor 206. In an embodiment, the primary PCIe adaptors 204, 206, 208, and 210 may not necessarily have the same configuration, such as a size of a PCIe link, storage capacity, and the like.

The PCIe RCMB 222 can stripe data from the PCIe adaptor 208 across the PCIe adaptors 204 and 206. The PCIe RCMB 222 can utilize the PCIe RCMBs 224 and 226 to stripe the data, and can also utilize well known striping techniques to divide the data mirrored from the PCIe adaptor 208 across the PCIe adaptors 204 and 206. Similarly, the PCIe RCMB 222 can stripe data from the PCIe adaptor 210 across the PCIe adaptors 204, 206, and 208. The PCIe RCMB 222 can utilize the PCIe RCMBs 224, 226, and 228 to stripe the data, and can also utilize well known striping techniques to divide the data mirrored from the PCIe adaptor 210 across the PCIe adaptors 204, 206, and 208. Thus, the PCIe RCMB 222 can mirror data from the first IOU to the second IOU of the PCIe root complex 202.

The information handling system 200 can utilize the different mirroring settings in the event of a failure to recover lost data. For example, if the PCIe adaptor 210 fails, the PCIe RCMB 222 can automatically begin to read data from the PCIe adaptors 204, 206, and 208 and can recover the data lost based on the failure of the PCIe adaptor 210. A new PCIe adaptor can then be connected to the PCIe ports 238 and 240, and the PCIe RCMB 222 can copy the data from the PCIe adaptors 204, 206, and 208 to the new PCIe port connected to the PCIe ports 238 and 240 of the PCIe root complex 202. However, if one or both of the PCIe ports 238 and 240 fail, the new PCIe adaptor can be connected to a third IOU containing additional PCIe ports. Then the PCIe RCMB 222 can copy data from the PCIe adaptors 204, 206, and 208 to the new PCIe adaptor. The PCIe RCMB 222 can also set the new PCIe adaptor as the primary PCIe adaptor. Thus, the mirroring of the PCIe adaptor 210 to the PCIe adaptors 204, 206, and 208 provides the information handling system 200 with the ability to retain data during a failure of one of the PCIe adaptors, one of the end points, one of the PCIe ports, or the like.

Figure 3:
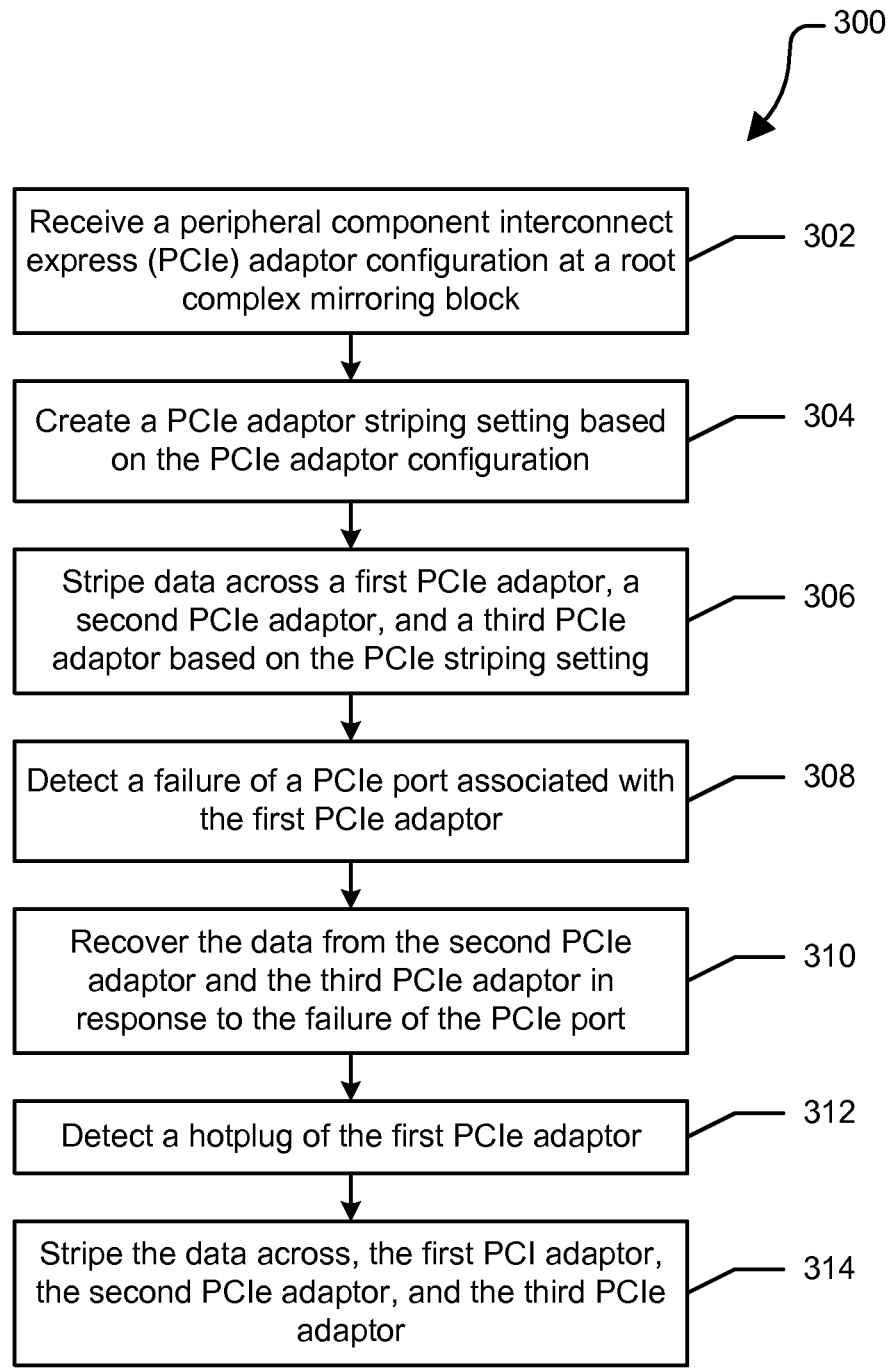
FIG. 3 is a flow diagram of a method for performing peripheral component interconnect express striping in a root complex.

FIG. 3 shows a flow diagram of a method 300 for performing peripheral component interconnect express striping in a root complex. At block 302, a PCIe adaptor configuration is received at a root complex mirroring block. The PCIe adaptor configuration can be based on the number of PCIe adaptors connected to the root complex, allocation of PCIe ports, and the like. A PCIe adaptor striping setting is created based on the PCIe adaptor configuration at block 304. The PCIe adaptor striping setting can include that data can be striped across two PCIe adaptors connected to one IOU and another PCIe adaptor connected to a different IOU.

At block 306, data is striped across the first PCIe adaptor, the second PCIe adaptor, and the third PCIe adaptor based on the PCIe adaptor striping setting. A failure is detected in a PCIe port associated with the first PCIe adaptor at block 308. At block 310, the data is recovered from the second PCIe adaptor and the third PCIe adaptor in response to the failure of the PCIe port. A hotplug of the first PCIe adaptor is detected at block 312. The hotplug can be that the first PCIe adaptor has been serviced, replaced, or the like. At block 314, the data is striped across the first PCIe adaptor, the second PCIe adaptor, and the third PCIe adaptor.

Figure 4:
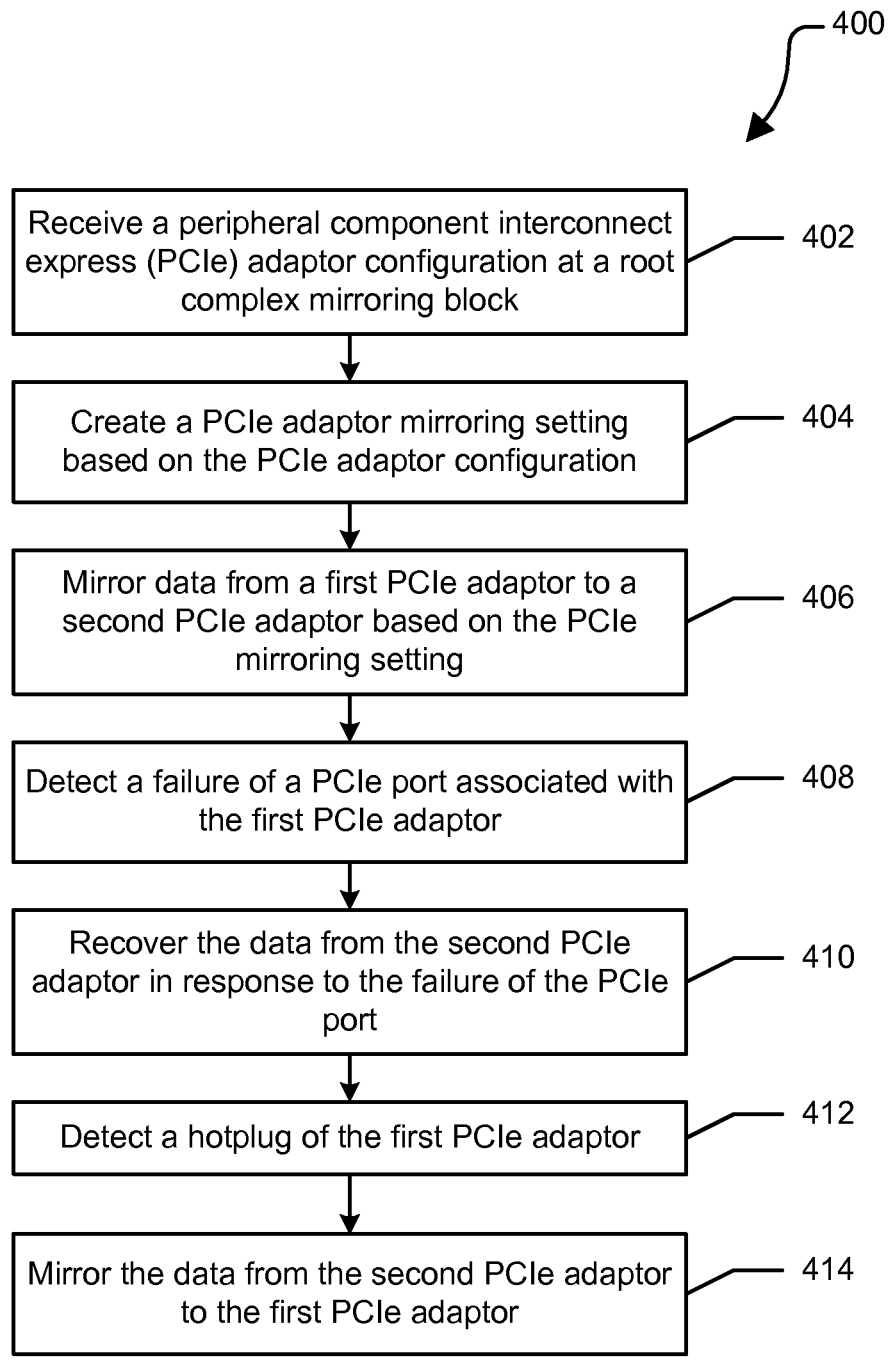
FIG. 4 is a flow diagram of a method for performing peripheral component interconnect express mirroring in a root complex.

FIG. 4 shows a flow diagram of a method 400 for performing peripheral component interconnect express mirroring in a root complex. At block 402, a PCIe adaptor configuration is received at a root complex mirroring block. The PCIe adaptor configuration can be based on the number of PCIe adaptors connected to the root complex, allocation of PCIe ports, and the like. A PCIe adaptor mirroring setting is created based on the PCIe adaptor configuration at block 404. The PCIe adaptor mirroring setting can include that a first PCIe adaptor in an IOU is a primary PCIe adaptor, and that a second PCIe adaptor in the IOU is a secondary adaptor. The PCIe adaptor mirroring setting can also include that data in a PCIe adaptor connected to one IOU can be mirrored in another PCIe adaptor connected to a different IOU.

At block 406, data is mirrored from the first PCIe adaptor to the second PCIe adaptor based on the PCIe adaptor mirroring setting. A failure is detected in a PCIe port associated with the first PCIe adaptor at block 408. At block 410, the data is recovered from the second PCIe adaptor in response to the failure of the PCIe port. The second PCIe adaptor can be made the primary PCIe adaptor. A hotplug of the first PCIe adaptor is detected at block 412. The hotplug can be that the first PCIe adaptor has been serviced, replaced, or the like. At block 414, the data from the second PCIe adaptor is mirrored to the first PCIe adaptor.

Figure 5:
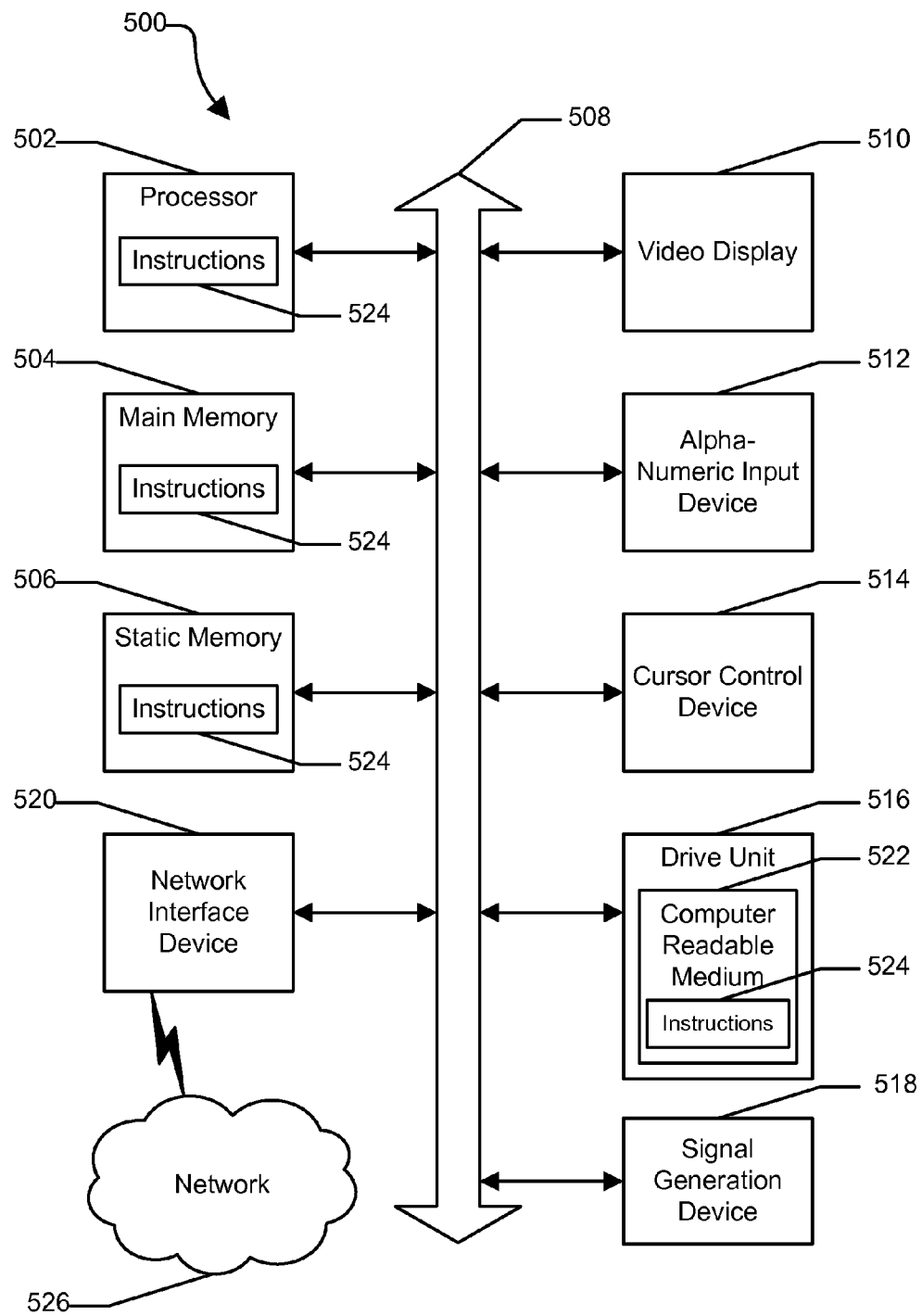
FIG. 5 is a block diagram of a general computer system.

FIG. 5 shows an illustrative embodiment of a general computer system 500 in accordance with at least one embodiment of the present disclosure. The computer system 500 can include a set of instructions that can be executed to cause the computer system to perform any one or more of the methods or computer based functions disclosed herein. The computer system 500 may operate as a standalone device or may be connected such as using a network, to other computer systems or peripheral devices.

In a networked deployment, the computer system may operate in the capacity of a server or as a client user computer in a server-client user network environment, or as a peer computer system in a peer-to-peer (or distributed) network environment. The computer system 500 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 500 can be implemented using electronic devices that provide voice, video or data communication. Further, while a single computer system 500 is illustrated, the term "system" shall also be taken to include any collection of systems or sub-systems that individually or jointly execute a set, or multiple sets, of instructions to perform one or more computer functions.

The computer system 500 may include a processor 502 such as a central processing unit (CPU), a graphics processing unit (GPU), or both. Moreover, the computer system 500 can include a main memory 504 and a static memory 506 that can communicate with each other via a bus 508. As shown, the computer system 500 may further include a video display unit 510, such as a liquid crystal display (LCD), an organic light emitting diode (OLED), a flat panel display, a solid state display, or a cathode ray tube (CRT). Additionally, the computer system 500 may include an input device 512, such as a keyboard, and a cursor control device 514, such as a mouse. The computer system 500 can also include a disk drive unit 516, a signal generation device 518, such as a speaker or remote control, and a network interface device 520.

In a particular embodiment, as depicted in FIG. 5, the disk drive unit 516 may include a computer-readable medium 522 in which one or more sets of instructions 524 such as software, can be embedded. Further, the instructions 524 may embody one or more of the methods or logic as described herein. In a particular embodiment, the instructions 524 may reside completely, or at least partially, within the main memory 504, the static memory 506, and/or within the processor 502 during execution by the computer system 500. The main memory 504 and the processor 502 also may include computer-readable media. The network interface device 520 can provide connectivity to a network 526, e.g., a wide area network (WAN), a local area network (LAN), or other network.

In an alternative embodiment, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 524 or receives and executes instructions 524 responsive to a propagated signal, so that a device connected to a network 526 can communicate voice, video or data over the network 526. Further, the instructions 524 may be transmitted or received over the network 526 via the network interface device 520.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. An information handling system comprising:
a peripheral component interconnect express root complex including first and second peripheral component interconnect express ports; and
a hardware root complex mirroring block in communication with the first and second peripheral component interconnect express ports, the hardware root complex mirroring block configured to mirror data between a first peripheral component interconnect express adaptor connected to the first peripheral component interconnect express port, and a second peripheral component interconnect express adaptor connected to the second peripheral component interconnect express port, to detect a failure of the first peripheral component interconnect express port, and to recover the data from the second peripheral component interconnect express port adaptor in response to the failure of the first peripheral component interconnect express port.

2. The information handling system of claim 1 further comprising:
a third first peripheral component interconnect express adaptor,
wherein the hardware root complex mirror block is further configured to stripe the data of the first peripheral component interconnect express adaptor by data striping the data across the first peripheral component interconnect express adaptor, the second peripheral component interconnect express adaptor, and the third peripheral component interconnect express adaptor.

3. The information handling system of claim 1 further comprising:
a first end point in communication with the first peripheral component interconnect express adaptor; and
a second end point in communication with the second peripheral component interconnect express adaptor.

4. The information handling system of claim 3 wherein the first end point and the second input are peripheral component interconnect express hard drives.

5. The information handling system of claim 1 wherein the first peripheral component interconnect express adaptor and the second peripheral component interconnect express adaptor have different configurations.

6. The information handling system of claim 1 wherein each of the plurality of peripheral component interconnect express ports is allocated a different portion of an input/output unit of the peripheral component interconnect express root complex.

7. The information handling system of claim 1 wherein a peripheral component interconnect express adaptor configuration for the first and second peripheral component interconnect express adaptors is based on a number of peripheral component interconnect express adaptors connected to the peripheral component interconnect express root complex, and the allocation of the peripheral component interconnect express ports.

8. A peripheral component interconnect express root complex comprising:
first and second peripheral component interconnect express ports; and
a hardware root complex mirroring block in communication with the first and second peripheral component interconnect express ports, the hardware root complex mirroring block configured to mirror data between a first peripheral component interconnect express adaptor connected to the first peripheral component interconnect express port, and a second peripheral component interconnect express adaptor connected to the second peripheral component interconnect express port, to detect a failure of the first peripheral component interconnect express port, and to recover the data from the second peripheral component interconnect express port adaptor in response to the failure of the first peripheral component interconnect express port.

9. The peripheral component interconnect express root complex of claim 8 wherein the hardware root complex mirror block is further configured to mirror the data of the first peripheral component interconnect express adaptor by data striping the data between the second peripheral component interconnect express adaptor and a third peripheral component interconnect express adaptor connected to a third peripheral component interconnect express port.

10. The peripheral component interconnect express root complex of claim 8 further comprising:
   a first end point in communication with the first peripheral component interconnect express adaptor; and
   a second end point in communication with the second peripheral component interconnect express adaptor.

11. The peripheral component interconnect express root complex of claim 10 wherein the first end point and the second input are peripheral component interconnect express hard drives.

12. The peripheral component interconnect express root complex of claim 8 wherein the first peripheral component interconnect express adaptor and the second peripheral component interconnect express adaptor have different configurations.

13. The peripheral component interconnect express root complex of claim 8 wherein each of the first plurality of peripheral component interconnect express ports is allocated a different portion of the first input output unit of the peripheral component interconnect express root complex.

14. A method comprising:
   mirroring, by a hardware root complex mirroring block, data between a first peripheral component interconnect express adaptor connected to a first peripheral component interconnect express port, and a second peripheral component interconnect express adaptor connected to the second peripheral component interconnect express port;
   detecting a failure of the first peripheral component interconnect express port; and
   recovering the data from the second peripheral component interconnect express port adaptor in response to the failure of the first peripheral component interconnect express port.

15. The method of claim 14 further comprising:
   detecting a third peripheral component interconnect express adaptor; and
   mirroring the data from the second peripheral component interconnect express adaptor to the third peripheral component interconnect express adaptor.

16. The method of claim 15 wherein the second peripheral component interconnect express adaptor is a primary peripheral component interconnect express adaptor, and the third peripheral component interconnect express adaptor is a secondary peripheral component interconnect express adaptor.

17. The method of claim 14 wherein the first peripheral component interconnect express adaptor is a primary peripheral component interconnect express adaptor, and the second peripheral component interconnect express adaptor is a secondary peripheral component interconnect express adaptor.

18. The method of claim 14 wherein peripheral component interconnect express port is allocated a portion of an input/output unit of a peripheral component interconnect express root complex.

19. The method of claim 14 further comprising:
   receiving, at a root complex mirroring block, a peripheral component interconnect express adaptor configuration; and
   creating, at the root complex mirroring block, a peripheral component interconnect express adaptor mirroring setting based on the peripheral component interconnect express adaptor configuration.

20. The method of claim 19 wherein the peripheral component interconnect express adaptor configuration is based on a number of peripheral component interconnect express adaptors connected to the peripheral component interconnect express root complex, and an allocation of the peripheral component interconnect express ports.

* * * * *